United States Patent Office 3,239,562
Patented Mar. 8, 1966

3,239,562
PROCESS FOR PREPARING CYCLOHEXYLAMINES
Robert S. Barker, Port Washington, N.Y., assignor to Halcon International, Inc., a corporation of Delaware
No Drawing. Filed Feb. 14, 1963, Ser. No. 258,649
3 Claims. (Cl. 260—563)

This invention relates to processes for preparing a cyclohexylamine from a cyclohexanol by reacting it with an aminating agent to produce the corresponding cyclohexylamine, more particularly to such processes wherein the catalyst is a calcium-silico-aluminate and the amination is carried out at about 250° to 350° C. and 200 p.s.i.g. The cyclohexylamine may be reacted with hydrogen peroxide to form the corresponding oxime which in turn may be reacted with concentrated sulfuric acid to form epsilon-caprolactam.

Various processes have been suggested heretofore for producing cyclohexylamine and also for converting the latter via a series of steps to epsilon-caprolactam, which is a commercially important material. The art is confronted by the problem of providing more efficient or economical processes for producing the cyclohexylamine as well as for producing epsilon-caprolactam.

The discoveries associated with the invention and relating to the solution of the above problems, and the objects achieved in accordance with the invention as set forth herein include the provision of:

A process for the preparation of a cyclohexylamine which comprises passing an aminating agent and a cyclohexanol into a reaction zone containing a neutral to basic silica-alumina catalyst, the concentration of said aminating agent being at least 1 mol per mol of cyclohexanol; maintaining the temperature in said reaction zone, in the range of 250° to 350° C. and the pressure therein in the range of 150 to 250 p.s.i.g., withdrawing a mixture from said reaction zone containing a cyclohexylamine and unreacted cyclohexanol; and separating unreacted cyclohexanol from said amine;

Such a process wherein cyclohexylamine is obtained from cyclohexanol;

Such a process wherein the temperature in the reaction zone is from about 260° to 300° C.;

Such a process wherein the aminating agent concentration is at least 2 moles per mol of the cyclohexanol;

Such a process wherein the aminating agent is ammonia;

Such a process wherein the aminating agent is an alkylamine having from 1 to 10 carbon atoms;

Such a process wherein the catalyst is a calcium-silico-aluminate;

Such a process wherein the catalyst is prepared by impregnating porous silica-alumina with an aqueous solution of a calcium salt followed by treatment with an aqueous alkali;

Such a process wherein the catalyst is pre-treated with hydrogen prior to the reaction;

Such a process wherein the alkali is potassium hydroxide;

Such a process wherein the aminating agent is mixed with a small amount of hydrogen in the range of 0.5 to 10.0% based on the volume of the agent;

and other objects which will be apparent as details or embodiments of the invention are set forth hereinafter.

In order to indicate still more fully the nature of the present invention, the following examples of typical procedures are set forth in which parts and percents mean parts and percents by weights, respectively, unless otherwise indicated, it being understood that these examples are presented as illustrative only and they are not intended to limit the scope of the invention.

EXAMPLE 1

Cyclohexanol, ammonia and cyclohexylamine are fed to a preheater together with recycle streams, hereinafter described, preheated to 250° C. and passed to a reactor. A suitable reactor is an iron pipe 1″ in diameter and 3′ long. The reactor feed stream contains cyclohexanol and ammonia in a molar ratio of 1:8 to 1:15. The feed passes over a catalyst at 245° to 330° C. and 200 p.s.i.g. pressure. The reaction product leaves the reactor and passes to a knock-out pot. Ammonia is removed overhead and liquid drains out. A portion of this liquid passes to a cooled scrubber wherein the hydrogen and ammonia are stripped of entrained liquid. The scrubber liquid returns via the drain and the scrubbed ammonia is recycled to the preheater. The liquid product passes to a distillation column at a temperature of 100° C., the unreacted cyclohexnaol is removed and recycled. Some cyclohexene is also removed. The product of the reaction is removed as a bottom product of the distillation and contains primarily cyclohexylamine (determined by titration). It is recovered by fractionation at 135° to 159° C., and then purified in known manner.

The cyclohexylamine in the feed (5% of charge) is used as a solidification point depressant to prevent solidification of cyclohexanol in the feed lines.

The catalyst is prepared by refluxing 500 cc. of 5% calcium acetate solution for 1 to 2 hours with 250 cc. of silica-alumina (Houdry S-90) and allowing the hot solution to stand for 24 to 48 hours at room temperature. The calcium acetate is decanted, the silica-alumina washed with a displacement wash of water and allowed to stand overnight with 500 cc. of 0.1 N. KOH. The KOH solution is decanted, the catalyst given 2 displacement washes with water (in a tube) and oven dried (110° C.). It is then placed into the reactor and brought to temperature in a slow stream of air to 400° C. (held two hours) followed by $N_2$ to displace air, followed by 2 to 4 hours of $H_2$. There cyclohexanol and ammonia in molar ratio of 1:12 are passed over the catalyst at a space velocity of 311 grms. of cyclohexanol and 636 grams of ammonia per liter of catalyst per hour and at a temperature of 276° C. The liquid effluent from the knock-out pot is analyzed and found to contain cyclohexylamine (about 67%).

This catalyst has a long active life, e.g., over 50 hours, as compared to active alumina which has an active life of less than 8 hours under similar conditions.

EXAMPLE 2

Using similar conditions to the above example, except without the hydrogen pre-treatment of the catalyst the yield is 37%.

EXAMPLE 3

Following Example 1 except using only the hydrogen pretreatment of the catalyst (350° C. for about 16 hours), 293° C., 14.6 mols of ammonia per mol of cyclohexanol and a space velocity of 189 of cyclohexanol and 452 of ammonia, the cyclohexylamine content of the effluent is 82%. This is more than double the yield of Example 2, and a very substantial improvement over the yield of Example 1.

EXAMPLE 4

Using similar conditions to Example 1, except that the feed ammonia contains 1% hydrogen, the catalyst shows a longer active life (e.g., over 75 hours) than when ammonia is used without hydrogen addition. The amount of hydrogen used here represents a small fraction of the amount that is normally used when using reducing catalysts of the copper, nickel, cobalt, or platinum types.

The small amount of hydrogen may be in the range of 0.5 to 10.0% based on the volume of ammonia or other aminating agent. This amount is insufficient to cause any appreciable hydrogenation of the reactants or products in the system, and it is only sufficient to eliminate or reduce the effects of impurities on the catalyst life.

The amines produced in accordance with the reaction described herein includes cyclohexylamine and substituted cyclohexylamines. The substitution may be of the hydrogen of a ring carbon or a hydrogen attached to the nitrogen atom or both. The substituted groups on the ring carbon corresponds to the hydrocarbon radical which is present on the oxygenated cyclohexane precursors, while the hydrocarbons annexed to the nitrogen atom would correspond to the hydrocarbon group of the aminating agent. Compounds which may be produced include, cyclohexylamine, methyl cyclohexylamine, dimethyl cyclohexylamine, dicyclohexylamine, and N-methylcyclohexylamine, and the like.

The following table will aid in understanding how the product obtained varies with changes in the selected starting materials.

*Table 1*

| Particular Cyclohexanol | Aminating Agent | Amine |
| --- | --- | --- |
| 1. Cyclohexanol | Ammonia | Cyclohexylamine. |
| 2. Methylcyclohexanol | do | Methylcyclohexylamine. |
| 3. Cyclohexanol | Methyl amine | N-methylcyclohexylamine. |

The cyclohexylamine is separated from the reaction mixture, e.g. by distillation and the small amount of residual cyclohexanol material is recycled to the amination step. The amine is reacted with hydrogen peroxide at a temperature in the range of about 0° to 20° C. in the presence of a tungstate catalyst such as sodium tungstate or cyclohexylamine tungstate whereby a cyclohexanone oxime is prepared. This is separated by distillation and a small portion of oxygenated cyclohexane material in the residue is recycled to the amination step. The oxime is reacted with concentrated sulfuric acid whereby epsilon-caprolactam is formed and this is separated and refined in known manner. It may be converted to nylon-6, a commercially important material, in known manner.

The treatment of cyclohexylamine with hydrogen peroxide may be carried out in the presence of a sequestering or chelating agent such as dipicolinic acid whereby the reaction may be conducted at a higher temperature, of the order up to 75° C.

By "a cyclohexanol" is meant cyclohexanol or its substituted derivatives in which one or more ring hydrogens is replaced by an aliphatic or aromatic hydrocarbon group or both. These compounds include methylcyclohexanol, dimethylcyclohexanol, trimethylcyclohexanol, ethylcyclohexanol, a diethylcyclohexanol, a methylethylcyclohexanol, a tetramethylcyclohexanol, a triethylcyclohexanol, propylcyclohexanol, a methyl-isopropylcyclohexanol, and the like, preferably having 6 to 20 carbon atoms in the molecule. The alkyl amine aminating agents include cyclohexylamine, a dimethylcyclohexylamine (having at least one amine hydrogen), ethylamine, diethylamine, n-propylamine, i-propylamine, methyl-ethylamine, butylamine, and the like.

In preparing the catalyst a calcium salt is preferred, but the other alkaline earth salts are operative. Any soluble salt may be used, e.g., nitrate, sulfate, chloride, formate, lactate, butyrate, and the like where water is the solvent. Examples are calcium acetate, barium lactate, magnesium formate, and the like. Analogous soluble salts would be used if the solvent is methanol or ethanol. Although potassium hydroxide is preferred, any alkali may be used in the treatment step, e.g., sodium, ammonium, lithium hydroxide or carbonate. The pH of an aqueous slurry of the catalyst is in the range of 7 to 11 for the "neutral to basic silica-alumina" catalyst.

The ratio of aminating agent to the cyclohexanol is at least 1 to 1 on a mol basis, desirably 10 to 1, and higher ratios, e.g., 30 to 1 give even less by-product. As a practical matter, 50 to 1 is regarded as an upper limit. The reaction mixture may contain inert diluents or other materials which are not detrimental; however, these may introduce problems as to recovery or purification.

In view of the foregoing disclosures, variations and modifications thereof will be apparent to one skilled in the art, and it is intended to include within the invention all such variations and modifications except as do not come within the scope of the appended claims.

What is claimed is:

1. A process for the preparation of a cyclohexylamine which comprises: contacting (1) an aminating agent selected from the group consisting of ammonia and alkyl amines having from 1 to 10 carbon atoms and (2) a cyclohexanol selected from the group consisting of cyclohexanol, methylcyclohexanol, dimethylcyclohexanol, trimethylcyclohexanol, ethylcyclohexanol, diethylcyclohexanol, methylethylcyclohexanol, tetramethylcyclohexanol, triethylcyclohexanol, propylcyclohexanol and methyl isopropylcyclohexanol in the presence of a hydrogen pretreated calcium-silico-aluminate catalyst at a temperature of from 250 to 350° C., and a pressure from 150 to 250 p.s.i.g., in a reaction zone, at least 1 mole of said aminating agent being present for each mole of cyclohexanol; and withdrawing a mixture from said reaction zone containing cyclohexylamine.

2. A process for the preparation of cyclohexylamine which comprises: contacting ammonia with cyclohexanol in a reaction zone containing a hydrogen pretreated calcium-silico-aluminate catalyst, said ammonia being present in a concentration of at least 1 mole per mole of cyclohexanol; maintaining a temperature in said reaction zone from 250 to 350° C, and a pressure from 150 to 250 p.s.i.g.; and withdrawing from said reaction zone a stream containing cyclohexylamine.

3. The process of claim 2 wherein the reaction zone contains less than 10% of hydrogen based on volume of ammonia.

References Cited by the Examiner

UNITED STATES PATENTS

| | | | |
| --- | --- | --- | --- |
| 1,992,935 | 3/1935 | Arnold | 260—585 |
| 2,043,965 | 6/1936 | Smeykal | 260—563 X |
| 2,078,922 | 5/1937 | Arnold | 260—585 |
| 2,113,241 | 4/1938 | Punnett | 260—585 |
| 2,285,419 | 6/1942 | Dickey et al. | 260—585 X |
| 2,365,721 | 12/1944 | Olin et al. | 260—585 |
| 2,456,072 | 12/1948 | Marisic | 252—455 X |
| 2,636,902 | 4/1953 | Taylor et al. | 260—585 |

CHARLES B. PARKER, *Primary Examiner.*